US007310536B2

(12) United States Patent
Desclos et al.

(10) Patent No.: US 7,310,536 B2
(45) Date of Patent: Dec. 18, 2007

(54) COUPLER FOR PHONE WITH MOVEABLE PORTIONS

(75) Inventors: Laurent Desclos, San Diego, CA (US); Vaneet Pathak, San Diego, CA (US); Gregory Poilasne, San Diego, CA (US); Sebastain Rowson, San Diego, CA (US)

(73) Assignee: Ethertronics, Inc., San Diego, CA (US)

( * ) Notice: Subject to any disclaimer, the term of this patent is extended or adjusted under 35 U.S.C. 154(b) by 374 days.

(21) Appl. No.: 10/409,364

(22) Filed: Apr. 8, 2003

(65) Prior Publication Data

US 2004/0204023 A1 Oct. 14, 2004

(51) Int. Cl.
*H04M 1/00* (2006.01)

(52) U.S. Cl. .............................. 455/550.1; 455/562.1; 455/575.1; 343/702

(58) Field of Classification Search ............ 455/575.1, 455/550.1, 562.1, 575.7; 345/702, 726
See application file for complete search history.

(56) References Cited

U.S. PATENT DOCUMENTS

| | | | | |
|---|---|---|---|---|
| 2,367,690 | A | 1/1945 | Purdy | 128/888 |
| 4,023,569 | A | 5/1977 | Warnecke et al. | 128/154 |
| 5,014,346 | A * | 5/1991 | Phillips et al. | 455/575.7 |
| 5,554,996 | A * | 9/1996 | Chatzipetros | 343/702 |
| 5,561,437 | A * | 10/1996 | Phillips et al. | 343/702 |
| 6,147,649 | A * | 11/2000 | Ivrissimtzis et al. | 343/700 MS |
| 6,342,859 | B1 * | 1/2002 | Kurz et al. | 343/702 |
| 6,600,450 | B1 * | 7/2003 | Efanov et al. | 343/726 |
| 6,911,940 | B2 * | 6/2005 | Poilasne et al. | 343/700 MS |
| 6,943,730 | B2 * | 9/2005 | Poilasne et al. | 343/700 MS |

* cited by examiner

*Primary Examiner*—Sanh D. Phu

(74) *Attorney, Agent, or Firm*—Foley and Lardner LLP

(57) ABSTRACT

A gap is provided between portions of a phone across which a signal between an antenna and a circuit is transferred.

15 Claims, 11 Drawing Sheets

97

97

COUPLER FOR PHONE WITH MOVEABLE PORTIONS

FIELD OF THE INVENTION

The present invention relates generally to the field of wireless communications, and particularly to antennas and their implementation in phone configurations.

BACKGROUND

The performance of many types of prior art phones is limited by inherent limitations of the phones and/or their antenna design. It is identified that use of some phones entails that one panel or portion be held by a hand of a phone user, whether in a fully closed, partially open, or fully open configuration. In doing so, the hand of the phone user is typically placed next or near an antenna in the panel or portion. With use of prior art phones, the hand of the phone user may capacitatively couple to the antenna to load and degrade signals received or sent by the antenna. It is desired to reduce or eliminate this loading and degradation of signals.

SUMMARY OF THE INVENTION

In one embodiment, a phone may comprise a first panel, which may comprise a respective upper or lower panel. In one embodiment, a phone may comprise a second panel, which may comprise a respective lower or upper panel. In one embodiment, where the first panel comprises an antenna, the second panel may designed for hand-held use. In one embodiment, where the second panel comprises an antenna, the second panel may be designed for hand-held use.

In one embodiment, a phone used to transfer a signal may comprise a first panel; a second panel; and a hinge, the hinge coupling the first panel and the second panel to effectuate a movement of the first panel relative to the second panel; wherein the hinge comprises one or more portion separated by a gap, and wherein the signal is coupled between the first panel and the second panel by a capacitative gap. A capacitance across the gap may vary in accordance with the movement.

In one embodiment, a hand held phone used to transfer a signal may comprise a first panel; a second panel; an antenna, wherein the antenna is coupled to the first panel; a circuit, wherein the circuit is coupled to the second panel; and a coupling portion, wherein the coupling portion couples the signal between the antenna and the circuit across a physical gap. The antenna may comprise a capacitatively loaded dipole antenna. The first panel may comprise a ground plane. The phone may comprise a flip-phone. The second panel may comprise a panel intended to be held by the hand. The first panel and the second panel may be connected by a conductive hinge. The first panel and the second panel may be connected by a non-conductive hinge. The second panel may comprise a device for converting sound into an electrical signal, wherein the first panel comprises a device for converting an electrical signal into sound. The first panel may comprise a device for converting sound into an electrical signal, wherein the second panel comprises a device for converting an electrical signal into sound. The coupling portion may comprise one or more portion, wherein the one or more portion is separated by one or more gap that varies in dimension.

In one embodiment, a phone may comprise a capacitatively loaded dipole antenna; a circuit; and a coupling portion, wherein the coupling portion couples a signal between the antenna and the circuit across a physical gap. The antenna may comprise an LC circuit that resonates at a plurality of frequencies.

In one embodiment, a coupler for coupling a signal between an antenna and circuit may comprise a first portion, wherein the first portion is electrically coupled to the antenna; and a second portion, wherein the second portion is electrically coupled to the circuit, and wherein the second and first portion are separated by a physical gap. The gap may define an approximately constant distance. The first portion and the second portion may be coupled over a range of orientations, wherein the gap defines a volume that changes over the range of orientations.

In one embodiment, a phone, may comprise an antenna, a circuit; and a coupling portion, wherein the coupling portion couples a signal between the antenna and the circuit across a physical gap. The gap may define an approximately constant distance. The antenna may be coupled to a first panel, wherein the circuit is coupled to a second panel, wherein the first panel and the second panel are coupled over a range of orientations, and wherein the gap defines a volume within which a capacitance changes over the range of orientations.

In one embodiment, a method for transferring a signal in a phone may comprise the steps of: disposing a first portion and a second portion in the phone to define a gap; and capacitatively coupling the signal across the gap. The method may further comprise the steps of coupling the first portion to an antenna; and coupling the second portion to a circuit. The antenna may comprise a dipole antenna. The method may further comprise the steps of coupling the first portion to a first panel; and coupling the second portion to a second panel; and moving one or more of the panels to change a dimension defined by the gap.

In one embodiment, a phone may comprise an antenna; a circuit; and coupling means for capacitatively coupling a signal between the antenna and the circuit.

In one embodiment, a phone used to transfer a signal may comprise a first portion; a second portion; a coupler, wherein the coupler effectuates movement of the first portion relative to the second portion; a first circuit element, the first circuit element coupled to the first portion; a second circuit element, the second circuit element coupled to the second portion; and a gap, wherein the first circuit element and the second circuit element define a dimension between the gap, and wherein the signal is coupled across the gap. The first circuit element may comprise a capacitively coupled dipole antenna. The second circuit element may comprise a capacitively coupled dipole antenna. The movement may comprise a rotating movement. The movement may comprise a linear movement. The gap may comprise a gap that varies in dimension in accordance with the movement.

This summary does not purport to define the invention. The invention is defined by the claims. Other embodiments will become apparent from a reading of the Description and Claims.

DETAILED DESCRIPTION OF THE INVENTION

In the following description, for purposes of explanation and not limitation, specific details are set forth in order to provide a thorough understanding of the present invention. However, it will be apparent to those skilled in the art that the present invention may be practiced in other embodiments that depart from these specific details. In other instances, detailed descriptions of well-known methods and devices are omitted so as to not obscure the description of the present invention with unnecessary detail.

Figure 1C:
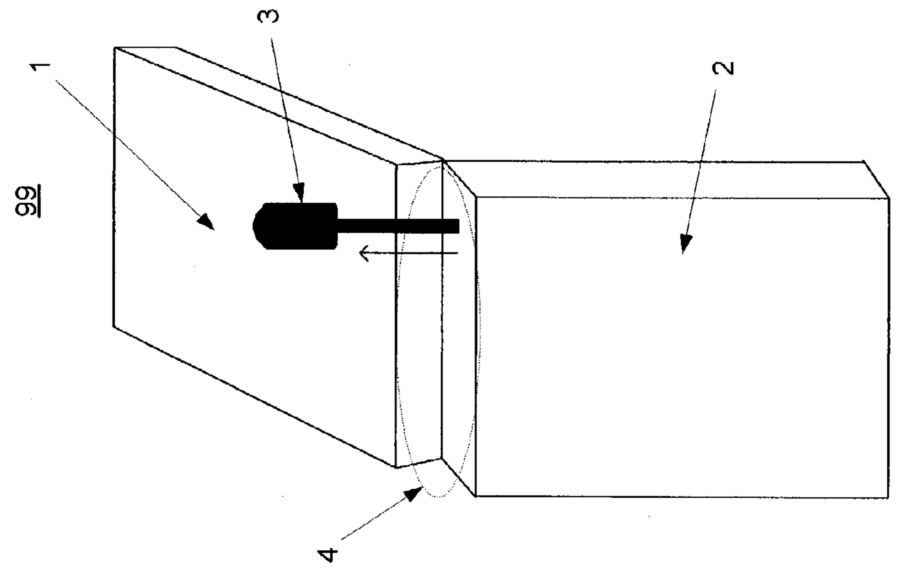
FIG. 1*c* illustrates a three-dimensional view of a prior art phone in a partially open configuration, and an antenna in an extended position.
Figure 1B:
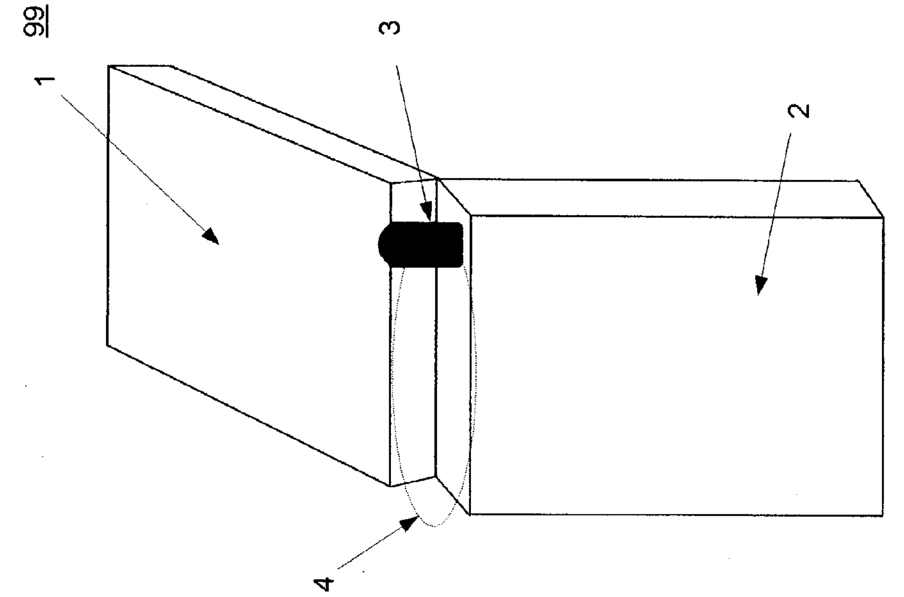
FIG. 1*b* illustrates a three-dimensional view of a prior art phone in a partially open configuration.
Figure 1A:
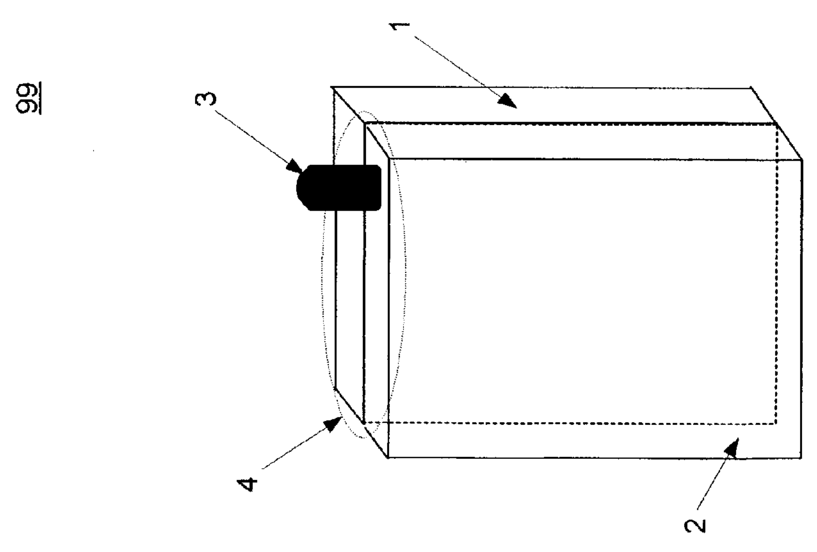
Figure 1A PRIOR ART
FIG. 1*a* illustrates a three-dimensional view of a prior art phone in a closed configuration.

FIG. 1*a* illustrates a three-dimensional view of a prior art phone in a closed configuration. In the embodiment shown, a phone (99) comprises a "flip-phone" known to those skilled in the art. Phone (99) comprises a top panel (1), a bottom panel (2), and an antenna (3). In the embodiment shown, antenna (3) is shown to comprise a monopole "whip" antenna (3) in a retracted position. Antenna (3) is coupled physically to bottom panel (2). Bottom panel (2) also comprises one or more circuit as is used by those skilled in the art for operation of phone (99). Antenna (3) is electrically coupled to the circuit(s) in bottom panel (2). Phone (99) also comprises a coupling area (4) where bottom panel (2) and top panel (1) are coupled together to enable the relative orientation of both panels to be altered. The shape and size of the panels can vary to meet the requirements of the specific application.

FIG. 1*b* illustrates a three-dimensional view of a prior art phone in a partially open configuration.

FIG. 1*c* illustrates a three-dimensional view of a prior art phone in a partially open configuration, and an antenna in an extended position. By extending the position of antenna (3) the reception of the phone (99) may be improved. The performance of phone (99) is limited by inherent limitations of the phone (99) and/or antenna (3) design. It is identified that use of phone (99) entails that bottom panel (2) be held by a hand of a phone user, whether in a fully closed, partially open, or fully open configuration. In doing so, the hand of the phone user is placed next or near the antenna (3). It is further identified that with use of prior art phones, the hand of the phone user may unadvantageously capacitively couple to the antenna (3) to load and degrade signals received or sent by the antenna.

Figure 2B:
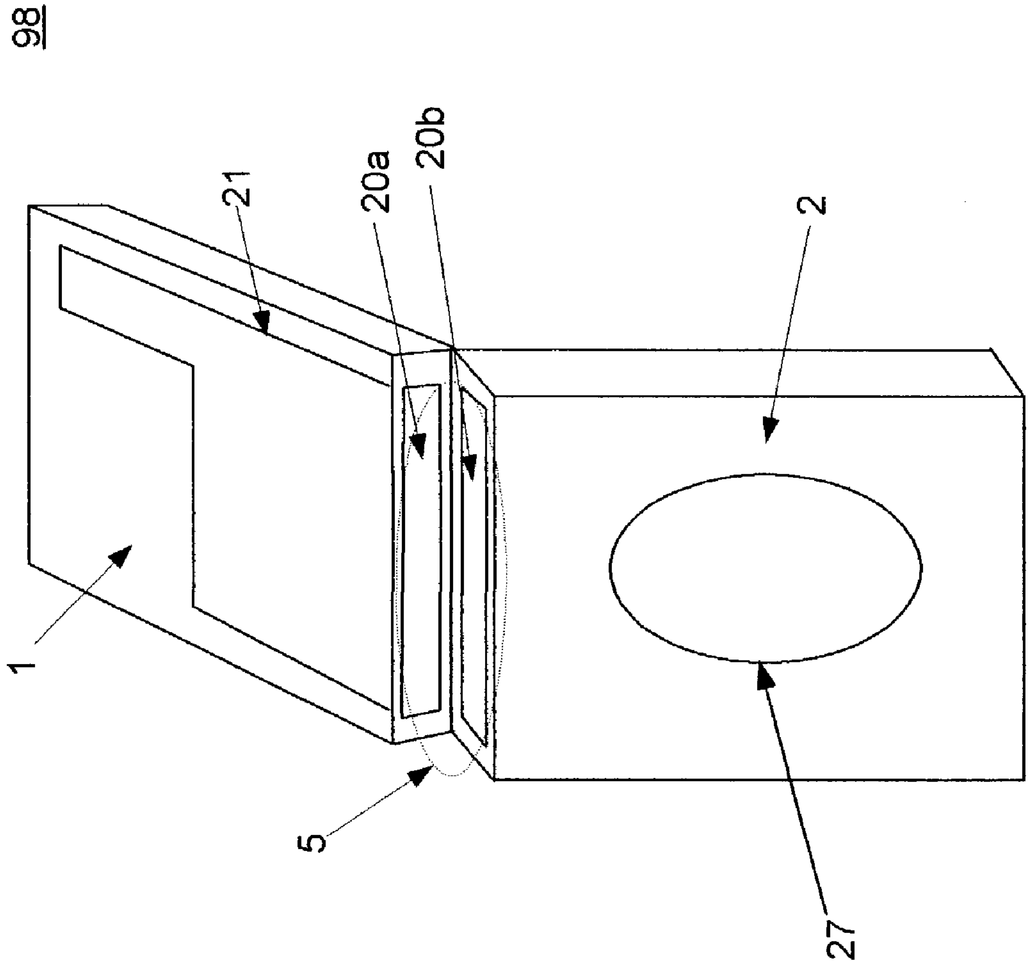
FIG. 2*b* illustrates a three-dimensional view of a phone in a partially open configuration.
Figure 2A:
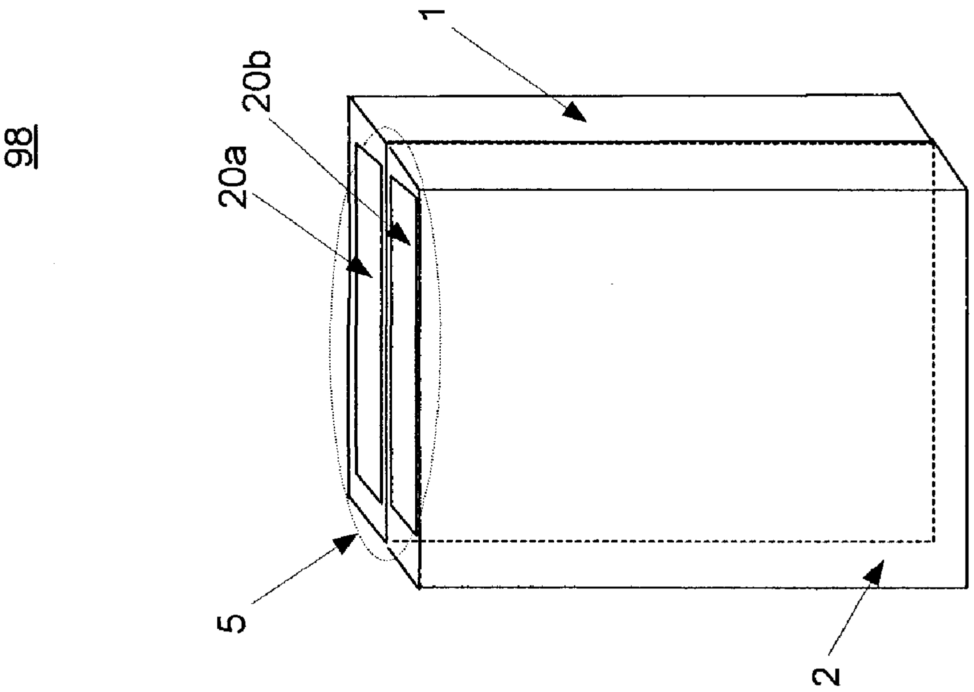
FIG. 2*a* illustrates a three-dimensional view of a phone in a closed configuration.

FIG. 2*a* illustrates a three-dimensional view of a phone in a closed configuration. In one embodiment, a phone (98) comprises a first portion or panel (1) and a second portion or panel (2). In one embodiment, phone (98) comprises a coupling area (5) where a top (1) and a bottom (2) panel are coupled. In one embodiment, within coupling area (5) phone (98) comprises one or more capacitative coupling portions, for example, coupling portions (20*a*), (20*b*), and/or other coupling portions discussed later. In one embodiment coupling portions (20*a*), (20*b*) may be physically coupled to respective panels (2), (1). In one embodiment, coupling portions (20*a*), (20*b*) are electrically isolated from respective panels (2), (1). In one embodiment, the top panel (1) and the bottom panel (2) are physically coupled in coupling area (5) by a hinge (not shown) that enables the orientation of both panels to be altered by a user in a controlled manner. In one embodiment, phone (98) comprises a "flip-phone". It is understood that in other embodiments, the shape, size, and number of panels can be varied to meet the requirements of a specific application and yet remain within the scope of the claims.

FIG. 2*b* illustrates a three-dimensional view of a phone in a partially open configuration. In one embodiment, a top panel (1) of a phone (98) comprises one or more circuit element, for example an antenna (21) coupled to top panel (1). In one embodiment, antenna (21) is electrically isolated from top panel (1). In one embodiment, bottom panel (2) comprises one or more circuit (27) coupled to bottom panel (2), for example, circuit(s) to those skilled in the art that may be used for processing signals received or sent by antenna (21). In one embodiment, the one or more circuit (27) is electrically isolated from bottom panel (2). In other embodiments antenna (21) and/or circuits (27) may be coupled to top panel (1) or bottom panel (2), for example, by a connection to a grounded area on the top panel and/or bottom panel.

Figure 3A:
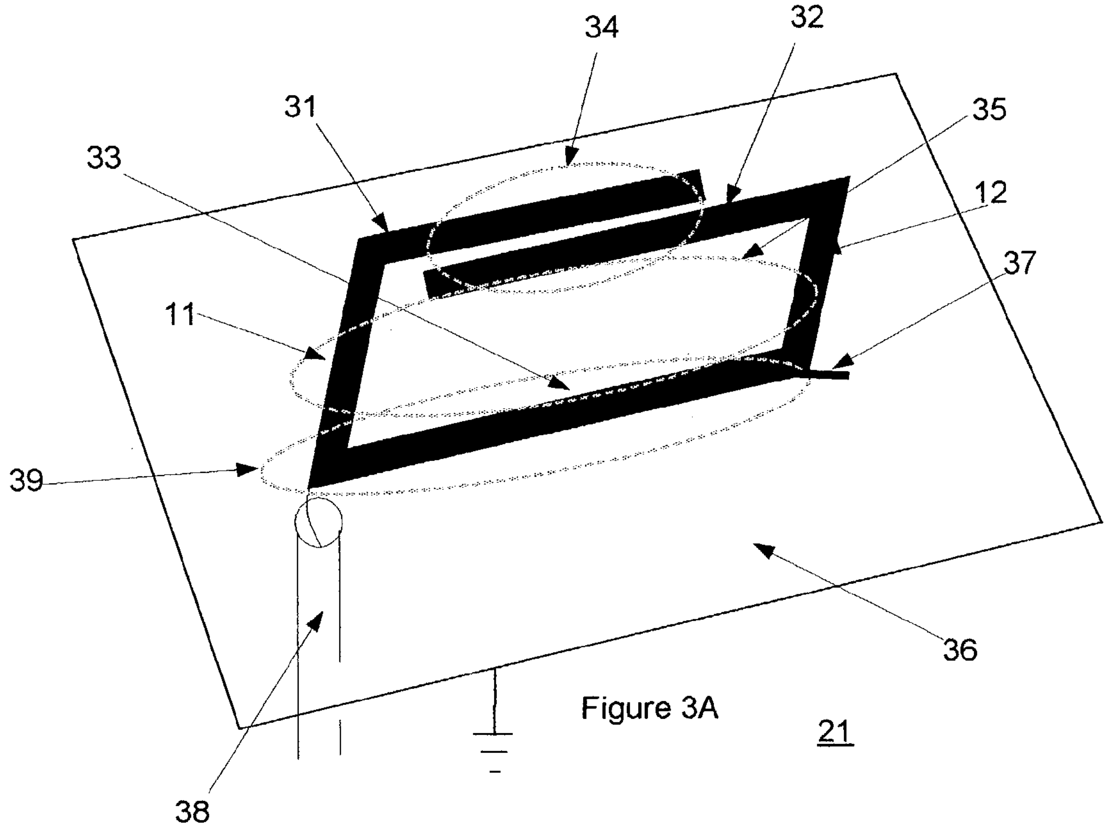
FIGS. 3*a-b* illustrate respective three-dimensional and side views of an antenna.
Figure 3B:
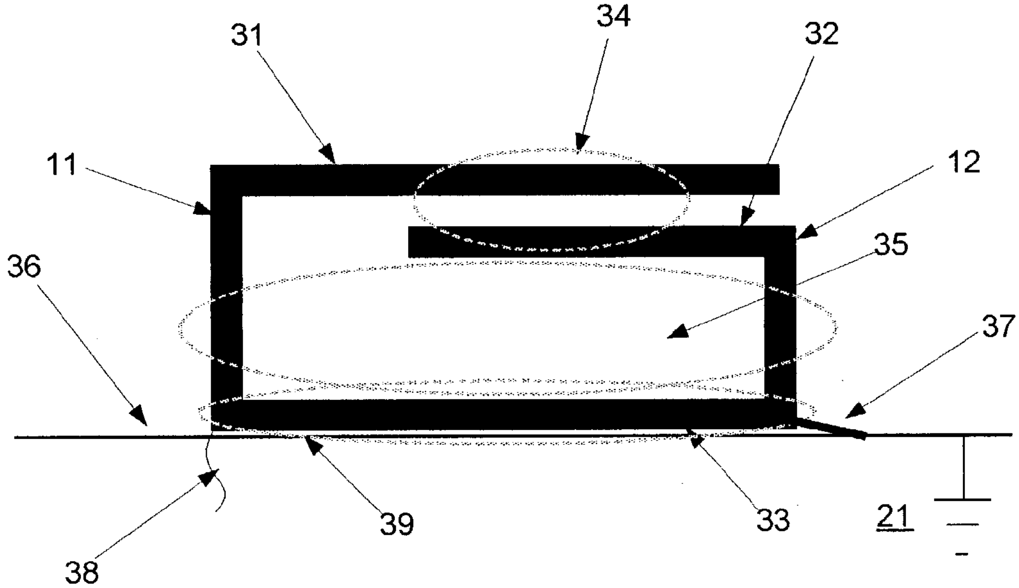

FIGS. 3*a-b* illustrate respective three-dimensional and side views of an antenna. In one embodiment, an antenna (21) may comprise a first (31), a second (32), and a third portion (33) coupled to effectuate operation of antenna (21) as a capacitively loaded magnetic dipole antenna. In one embodiment, the first portion (31) is coupled to the third portion (33) by a first coupling portion (11), and the third portion (3) is coupled to second portion (32) by a second coupling portion (12). In one embodiment, antenna (21) comprises a feed area, generally indicated as feed area (39), where input or output signals are provided by a feedline (38) that is coupled to the third portion (33). In one embodiment, the first coupling portion (11) and the second coupling portion (12) are disposed relative to each other in a generally parallel relationship. In one embodiment, first portion (31), second portion (32), and third portion (33) are disposed relative to each other in a generally parallel relationship. In one embodiment, first portion (31), second portion (32), and third portion (33) are disposed relative to each other in a generally coplanar relationship. In one embodiment, the portions (31), (32), and (33) are generally orthogonal to portions (11) and (12). In one embodiment, antenna (21) is electrically coupled to a ground by a ground connection (37). In one embodiment, antenna (21) is electrically coupled to a ground plane (36). In one embodiment, third portion (33) is coupled to ground by a ground connection (37). It is understood, however, that the present invention is not limited to the described embodiments, as in other embodiments portions (31), (32), (33), (11), (12) may be disposed relative to each other in other geometrical relationships and with other geometries. For example, first portion (31) may be coupled to third portion (33), and third portion (33) may be coupled to second portion (32) by respective coupling portions (11) and (12) such that one or more of the portions are disposed relative to each other in non-parallel, non-orthogonal, and/or non-coplanar relationships.

It is identified that antenna (21) may be modeled as a radiative resonant LC circuit element with a capacitance (C) that corresponds to a fringing capacitance that exists across a first void that is bounded generally by first portion (31) and second portion (32), and which is indicated generally as capacitative area (34); and with an inductance (L) that corresponds to an inductance that exists in a second void that is bounded generally by the second portion (32) and third portion (33), and which is indicated generally as inductive area (35).

It is further identified that the geometrical relationship between portions (31), (32), (33), (11), (12), and the gaps formed thereby, may be used to effectuate an operating frequency about which the antenna (21) resonates to radiate or receive a signal.

Figure 3C:
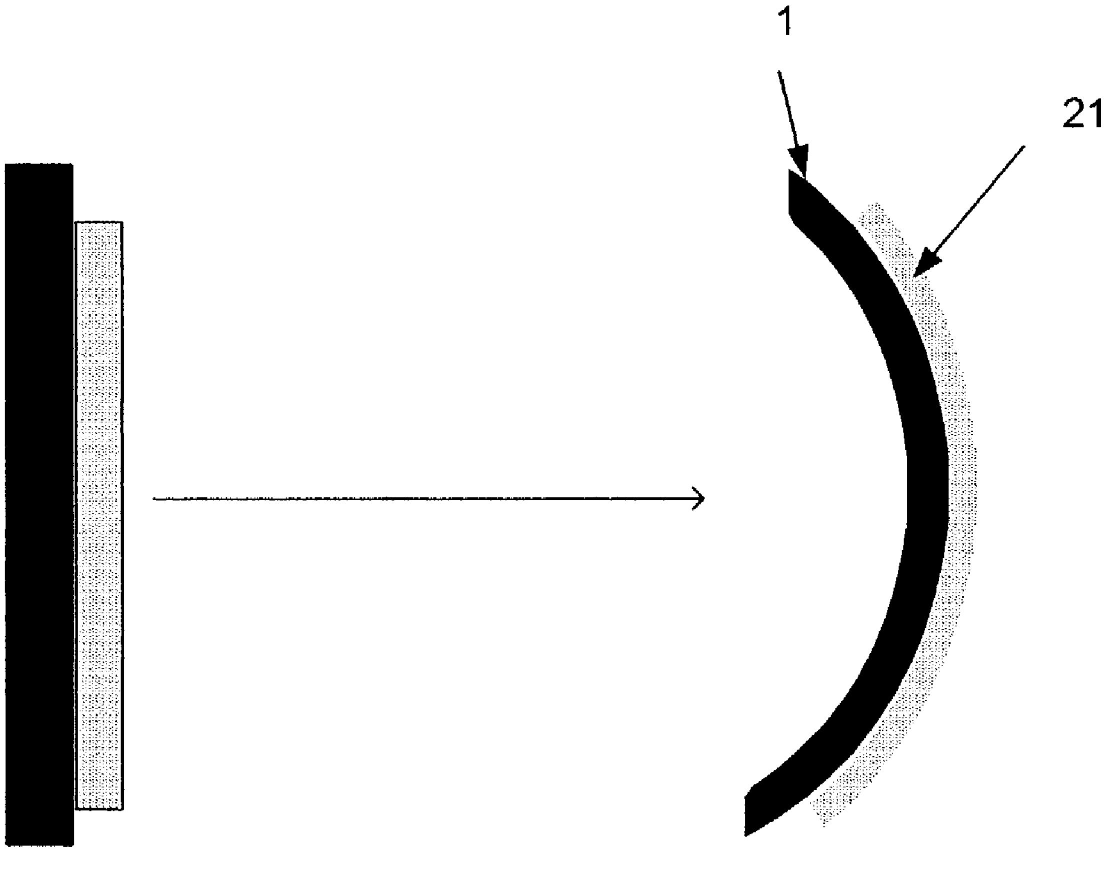
FIG. 3*c* illustrates a side view of an antenna coupled to a panel or portion of a phone.

FIG. 3*c* illustrates an antenna coupled to a top panel. In one embodiment, a top panel (1) comprises a curved geometry. It is identified that one or more portion of antenna (21) may also comprise a curved geometry. In other embodiments, top panel (1) and or one or more portion of an antenna (21) may comprise other geometries. In one embodiment, top panel (1) may comprise a ground plane. In one embodiment, portions (31), (32), (33), (11), and/or (12) may comprise conductors. It is identified that conductors may also be shaped to comprise one or more geometry, for example, cylindrical, planar, etc., or other geometries known to those skilled in the art. The conductors may be flexible, rigid, or a combination thereof.

Figure 3D:
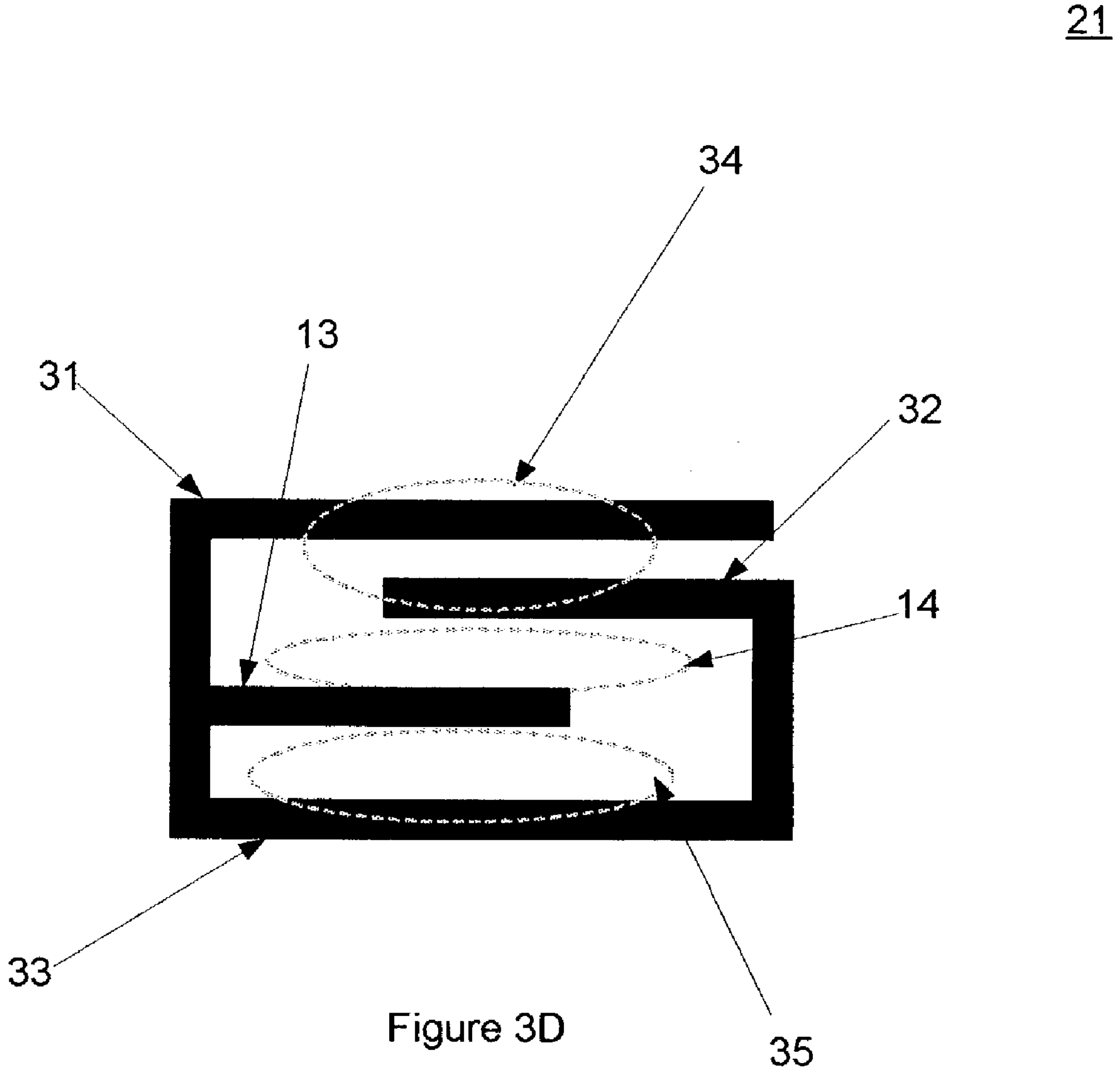
FIG. 3*d* illustrates a side view of an antenna.

FIG. 3*d* illustrates a capacitatively loaded dipole antenna. It is identified that an antenna (21) is not to be limited by portions (31), (32), (33), (11), and/or (12), as in other embodiments, antenna (21) may comprise fewer or greater portions to effectuate an antenna that operates at one or more frequency about which antenna (21) resonates to radiate or receive a signal. For example, in one embodiment, antenna (21) comprises an additional parasitic element comprising portion (13), which forms an additional gap (14) by which an additional resonant frequency about which antenna (21) may resonate.

Figure 4A:
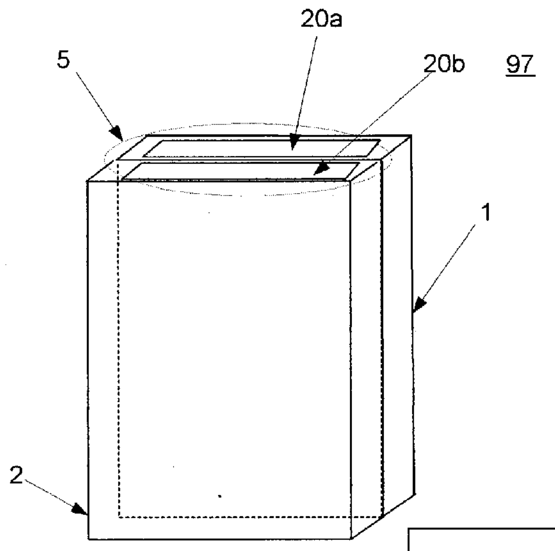
FIG. 4*a* illustrates a three-dimensional view of a phone in a closed configuration.

FIG. 4*a* illustrates a three-dimensional view of a phone in a closed configuration. In one embodiment, a phone (97) comprises a top panel (1), a bottom panel (2), coupling portions (20*a*), (20*b*), and/or other portions not illustrated. In the embodiment shown, phone (97) comprises a "flip-phone". In one embodiment, phone (97) comprises a coupling area (5).

Figure 4B:
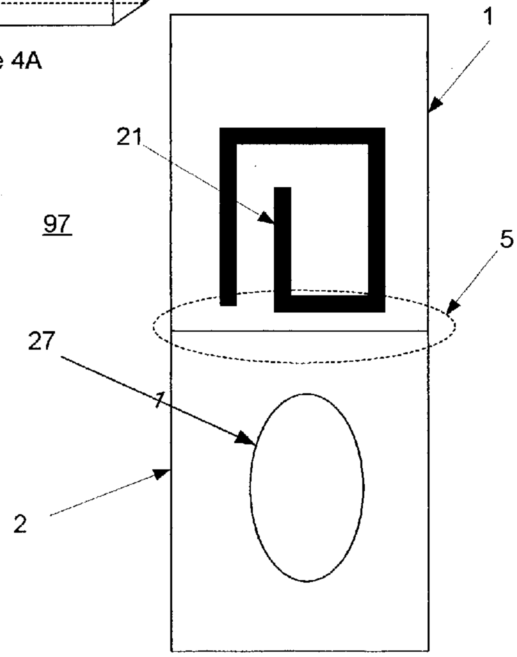
FIG. 4*b* illustrates a front view of a phone in a fully open configuration.

FIG. 4*b* illustrates a front view of a phone in a fully open configuration. In one embodiment, top panel (1) of a phone (97) comprises one or more circuit element, for example, antenna (21). In one embodiment, antenna (21) comprises one or more portion of a capacitively coupled dipole antenna. In one embodiment, bottom panel (2) includes one or more circuit (27), for example, circuit(s) known to those skilled in the art that may be used for processing signals received or sent by antenna (21).

Figure 4C:
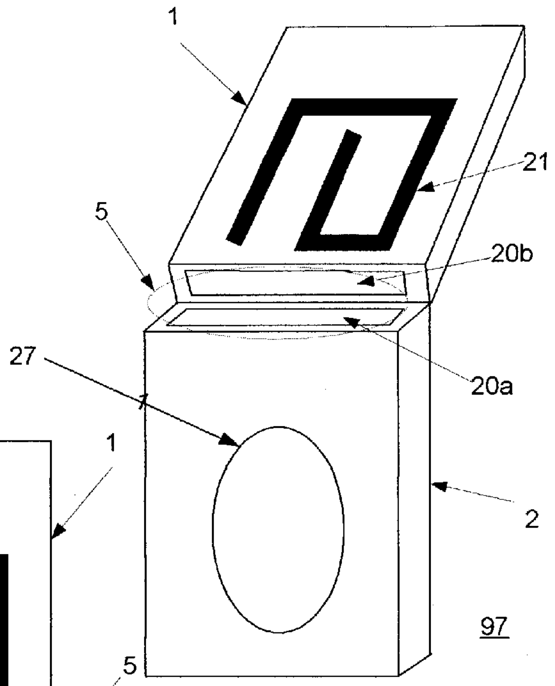
FIG. 4*c* illustrates a three-dimensional view of a phone in a partially open configuration.

FIG. 4*c* illustrates a three-dimensional view of a phone in a partially open configuration.

Figure 5A:
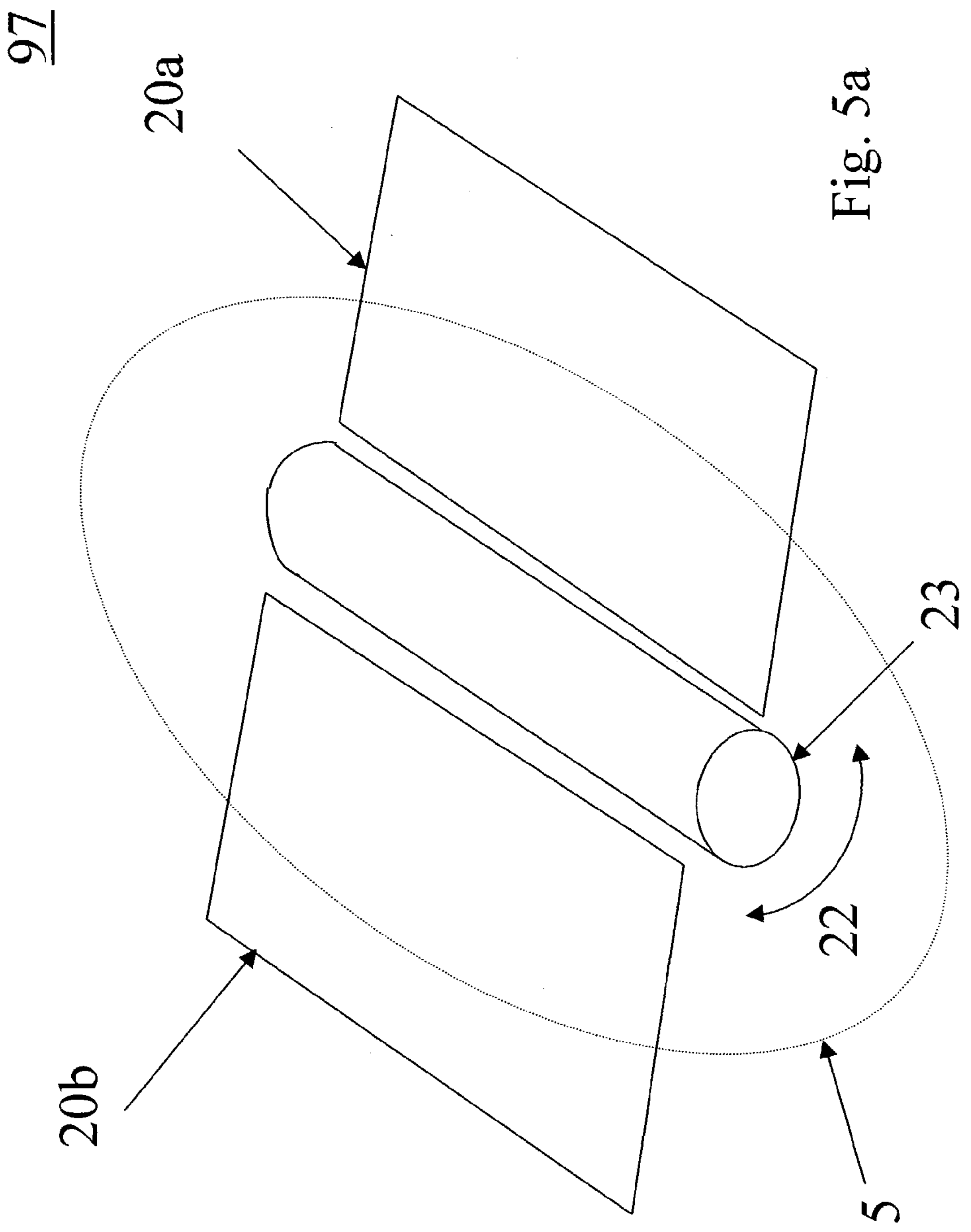
FIG. 5*a* illustrates a three-dimensional view of a coupling area.

FIG. 5*a* illustrates a three-dimensional view of a coupling area. In one embodiment, a phone (97) comprises coupling portions 20(*a*) and 20(*b*). In one embodiment, portions 20(*a*) and 20(*b*) are disposed about or near a coupling area (5) of a phone (97). In one embodiment, portions 20(*a*) and 20(*b*) are disposed about or near a hinge (23). In one or more embodiment, hinge (23) physically couples panel (1) and panel (2) of the phone (97). In one embodiment, hinge (23) may electrically isolate panel (1) from panel (2). In one embodiment, hinge (23) may electrically connect panel (1) to panel (2). In FIG. 5*a*, the orientation of portions 20(*a*) and 20(*b*) approximates their orientation in a fully closed phone (97). In one embodiment, portion 20(*b*) is electrically coupled to a capacitively loaded dipole antenna, for example, to a feed area of antenna (21) described previously; and portion 20(*a*) is electrically coupled to one or more circuit, for example circuit(s) (27) of phone (97). It is identified that as panels (1) and (2) of phone (97) are rotated, for example about hinge (23) in a direction (22), the relative orientation of portions 20(*a*) and 20(*b*) may vary. In one embodiment, in a fully closed position, an angular orientation and resulting volume of the gap between portions 20(*a*) and 20(*b*) may become maximized, and in a fully closed position the angular orientation and resulting volume of the gap between portions 20(*a*) and 20(*b*) may become minimized.

It is identified, that signals received or sent by antenna (21) may be capacitively coupled to circuit(s) (27) by capacitance that is created within the resulting volumetric area of the resulting gap formed between portions 20(*a*) and 20(*b*). In one embodiment, portions 20(*a*) and/or 20(*b*) comprise flat geometries. It is identified that a maximized volumetric area of the gap may result in a maximized capacitance between portions 20(*a*) and 20(*b*), and that a minimized volumetric area of the gap may result in a minimized capacitance between portions 20(*a*) and 20(*b*). It is identified that portions 20(*a*) and 20(*b*) may comprise other than flat geometries, for example curved, semi-curved, combinations thereof, or others used by those skilled in the art to effectuate one or more capacitative gap.

Figure 5B:
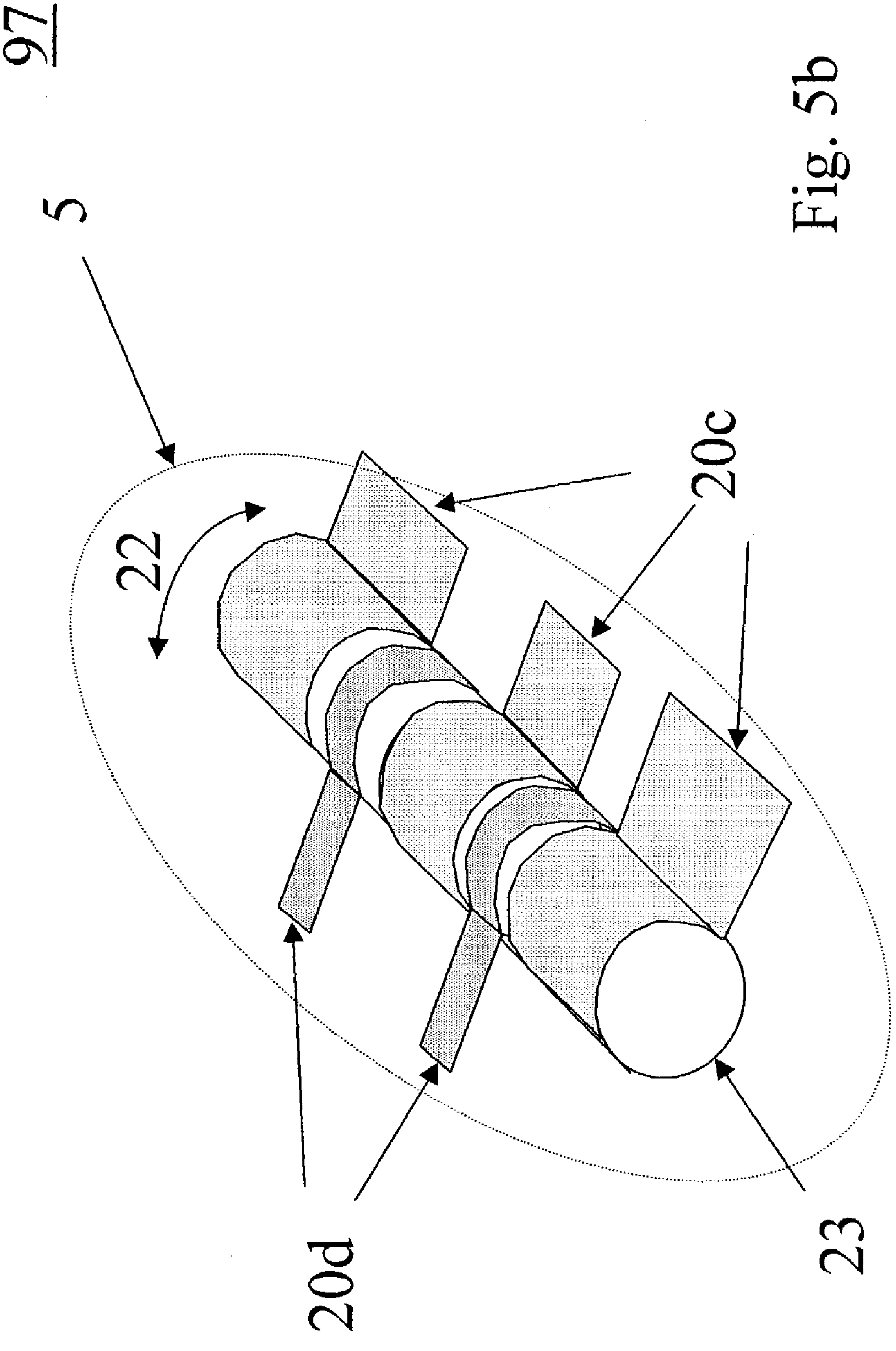
FIG. 5*b* illustrates a three-dimensional view of a coupling area.

FIG. 5*b* illustrates a three-dimensional view of a coupling area. In one embodiment, a phone (97) comprises coupling portions 20(*c*) and 20(*d*). In one embodiment, portions 20(*c*) and 20(*d*) are disposed about or near a coupling area (5) of the phone (97). In one embodiment, portions 20(*c*) and 20(*d*) are disposed about or near a hinge (23). In one embodiment, portions 20(*c*) and/or 20(*d*) comprise geometries designed to slidably rotate about hinge (23) in a direction (22). In one embodiment portions 20(*c*) and 20(*d*) are electrically isolated from hinge (23). In the illustrated embodiment, portions 20(*c*) and 20(*d*) comprise curved geometries. In one embodiment, portions 20(*c*) and 20(*d*) are disposed about hinge (23) such that portions 20(*c*) and 20(*d*) are linearly separated by a distance that defines a gap. It is understood that other geometries that slidably rotate about hinge (23) and separate portions 20(*c*) and 20(*d*) by a gap are within the scope of the invention and could be implemented by those skilled in the art. In one embodiment, one or more portion 20(*d*) is coupled to a capacitively loaded dipole antenna, for example, antenna (21) described previously; and one or more portion 20(*c*) is coupled to one or more circuit, for example circuit(s) (27) described previously. It is identified that as panels (1) and (2) are rotated, for example about hinge (23) in a direction (22), the orientation of portions 20(*c*) and 20(*d*) may vary. It is also identified that for each orientation of portions 20(*c*) and 20(*d*), one or more of the gaps defined by a linear distance between the portions remains approximately fixed. It is identified that signals received or sent by antenna (21) may capacitively couple to circuit(s) (27) by a capacitance that is created across the linear distance between the gap(s) formed by the curved geometries of portions 20(*c*) and 20(*d*). It is identified that as compared to the flat geometry of portions 20(*a*) and 20(*b*) illustrated by FIG. 5*a*, the capacitance across the fixed gap between portions 20(*c*) and 20(*d*) may remain more constant over the range of possible orientations of panels (1) and (2).

Figure 5C:
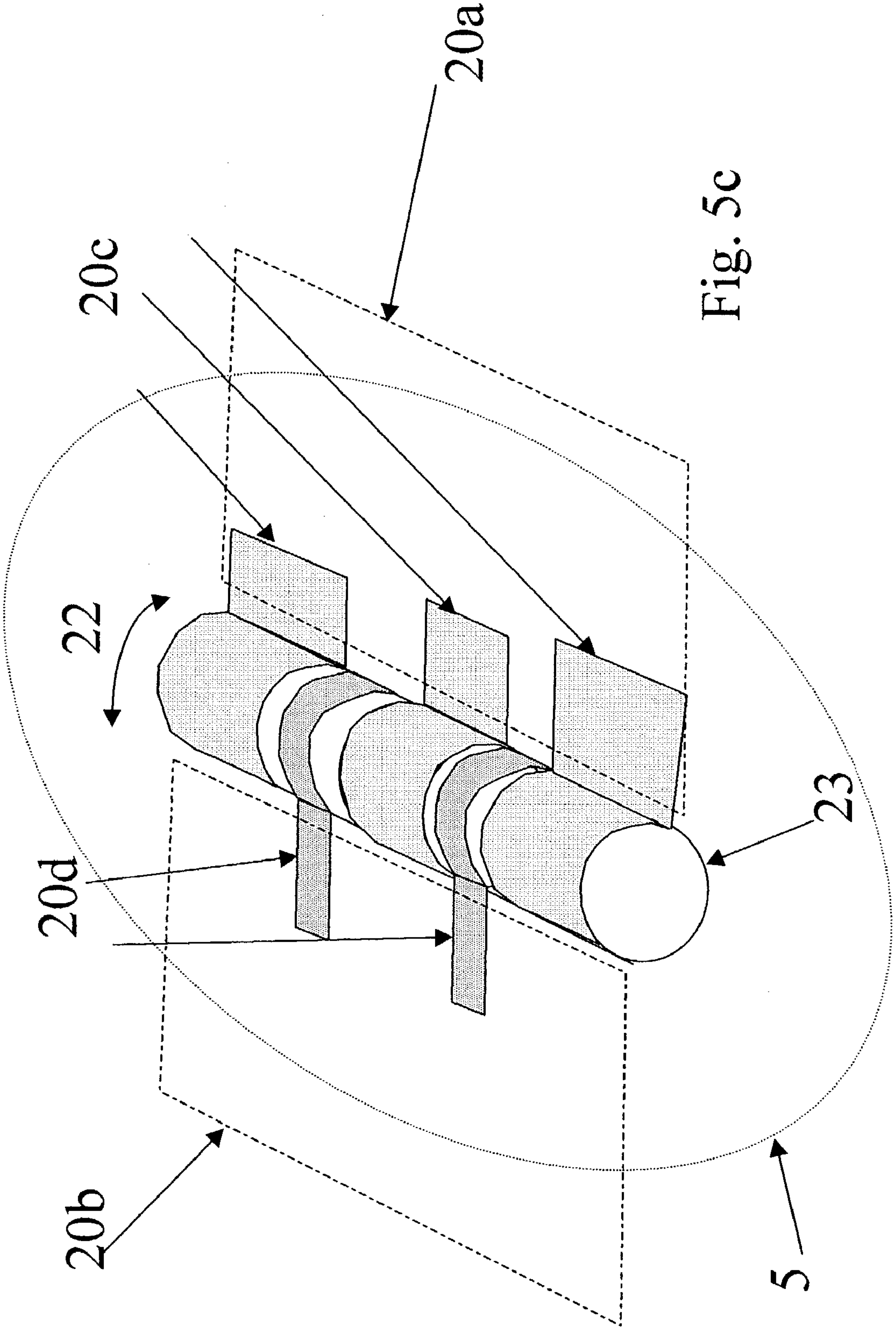
FIG. 5*c* illustrates a three-dimensional view of a coupling area.

FIG. 5*c* illustrates a three-dimensional view of a coupling area. In one embodiment, a phone (97) comprises coupling portions 20(*a*)-(*d*). In one embodiment, portions 20(*a*)-(*d*) are disposed about or near a coupling area (5). In one embodiment, portions 20(*a*)-(*d*) are disposed about or near a hinge (23). In the illustrated embodiment, the orientation of portions 20(*a*)-(d) approximates the orientation in a fully closed phone (97). In one embodiment, portion 20(*a*) is electrically coupled to portion(s) 20(*c*), and portion 20(*b*) is electrically coupled to portion(s) 20(*d*). In one embodiment, portion 20(*b*) is electrically coupled to a capacitively loaded dipole antenna, for example, to a feed area of antenna (21) described previously; and portion 20(*a*) is coupled to one or more circuit, for example circuit(s) (27) described previously. It is identified that as panels (1) and (2) of phone (97) are rotated, for example about hinge (23) in a direction (22), the orientation of portions 20(*a*), 20(*c*), and 20 (*b*), 20(*d*) relative to each other may vary. It is identified, that signals received or sent by antenna (21) may be capacitively coupled to circuit(s) (27) by a capacitance that exists across one or more gap that is formed between portions 20(*a*), 20(*b*), 20(*c*), and/or 20(*d*). It is identified that depending on the orientation of the panels of phone (97), the capacitance across the gap may be different. In one embodiment, portions 20(*a*)-(*d*) comprise geometries described in accordance with the descriptions of FIGS. 5*a*-*b*. It is identified that portions 20(*a*)-(*d*) may comprise other than flat and/or curved geometries, for example semi-curved, combinations thereof, or others used by those skilled in the art to effectuate capacitative coupling across a gap.

Figure 6:
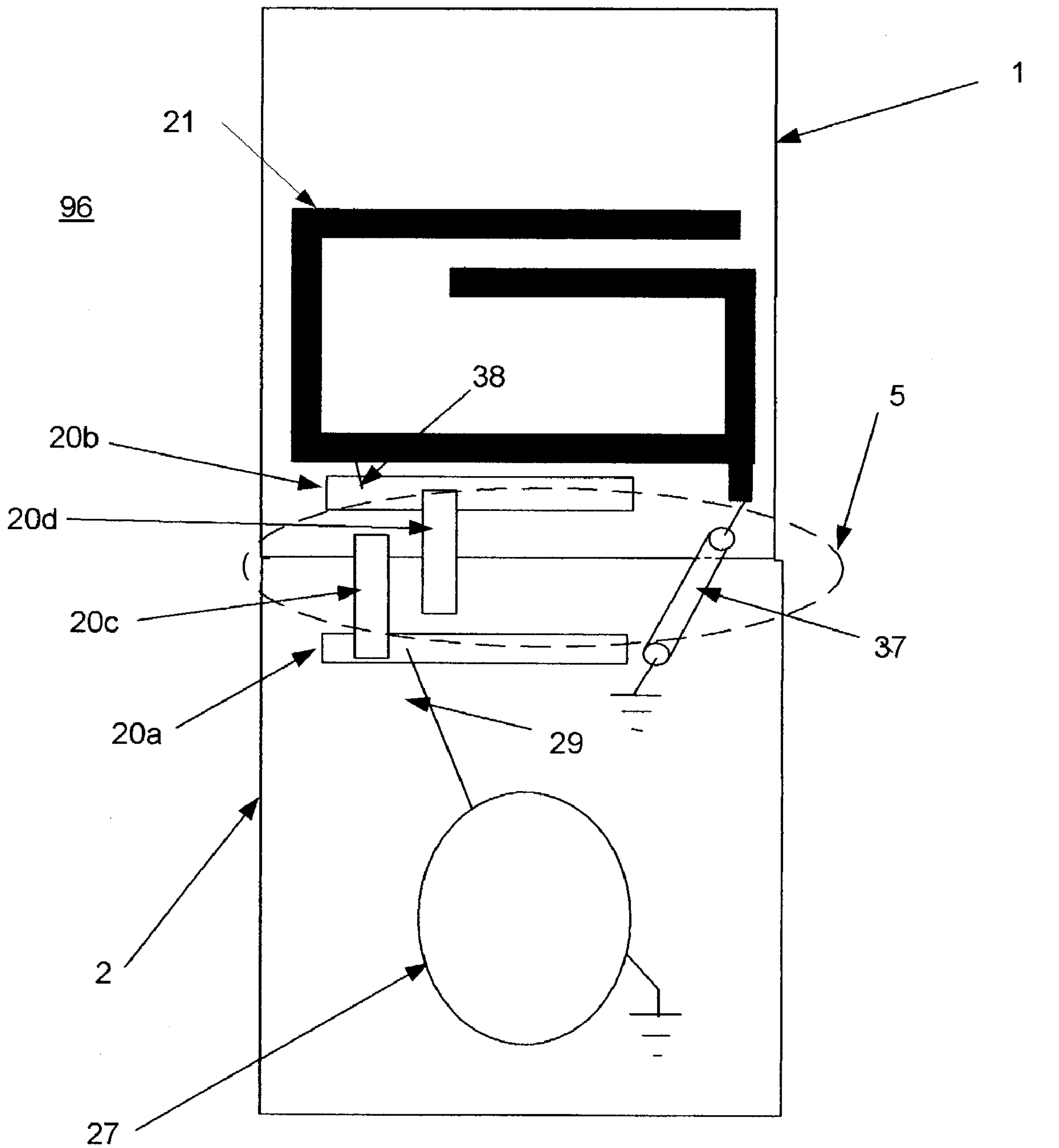
FIG. 6 illustrates a front view of a phone in a fully open position.

FIG. 6 illustrates a front view of a phone in a fully open position. In one embodiment, a phone (96) incorporates one or more aspect of embodiments described previously herein. In one embodiment, phone (96) comprises a top panel (1) coupled at or near a coupling portion (5) to a bottom panel (2). In one embodiment, top panel (1) includes one or more circuit element, for example, an antenna (21). In the illustrated embodiment, antenna (21) comprises one or more portion disposed to effectuate a capacitively coupled dipole antenna (21). In one embodiment, bottom panel (2) comprises one or more circuit (27). In one embodiment, phone (96) comprises coupling portions 20(*a*)-(*d*). In one embodiment, coupling portions 20(*b*) and/or 20(*c*) are electrically coupled to a feed point of antenna (21) by a feedline (38). In one embodiment, coupling portions 20(*c*) and/or 20(*d*) are electrically coupled to circuit(s) (27) by a circuit connection (29). In one embodiment, signals between antenna (21) and circuit(s) (27) are capacitively coupled across one or more of the gaps created by one or more of the portions 20(*a*)-(*d*). In one embodiment, antenna (21) and circuit(s) (27) are electrically coupled by connections to a ground. In one embodiment, antenna (21) and circuit(s) (27) are electrically coupled to a ground by one or more ground connection (37). In one embodiment, ground connection(s) (37) may comprise a coaxial cable or other connector that electrically connects a ground point of antenna (21) to a ground point of circuit(s) (27). In one embodiment, antenna (21) and circuit(s) (27) may be electrically connected by electrical connections to one or more conductive portion of panel (1) and/or panel (2), and by electrical connections between panel (1) and panel (2) within coupling area (5).

It is identified that by coupling an antenna to panel (1), rather than as done in the prior art, to panel (2), which in one embodiment is the panel that is held by a phone user during operation of a flip-phone, the capacitative and loading effects of a user's hand on an antenna of a flip-phone may be advantageously reduced, thus increasing and improving performance characteristics of the flip-phone. It is identified, the capacitative and loading effects or a user's hand are reduced by virtue of the increased distance of a phone user's hand from the phone antenna. It is further identified that placement of an antenna in panel (1) away from one or more circuits in panel (2) may be effectuated by capacitative coupling of the antenna to the circuit(s) by one or more capacitative coupling portions. By providing capacitative coupling portion(s) to enable signals to be transferred between an antenna and one or more circuits, the number of physical, mechanical, and/or electrical connections may be reduced or eliminated within a coupling area of a phone that utilizes a coupling portion, for example, about or near a hinge. By eliminating or reducing the number of physical, mechanical, and/or electrical connections, mechanical breakdowns and reliability within or near a coupling area of a flip-phone may be improved.

It will be recognized that the preceding description embodies one or more invention that may be practiced in other specific forms without departing from the spirit and essential characteristics of the disclosure.

For example, although a bottom panel is described in one embodiment to be intended to be held by the hand of a user, in one or more embodiment, a top panel may be intended to be held by the hand of a user. Furthermore, in one or more embodiment, one or more circuit element, for example an antenna, may be coupled to the bottom panel, and one or more circuit element may be coupled to the top panel. It is identified that in one or more of such alternative embodiments, a signal may also be coupled across the coupling portion or capacitative gap described above. Thus, in one embodiment, a panel may be intended to be held by the hand of a user and still effectuate positioning of the hand away from an antenna that is coupled to another panel.

Figures 7A, 7B, 7C, 7D:
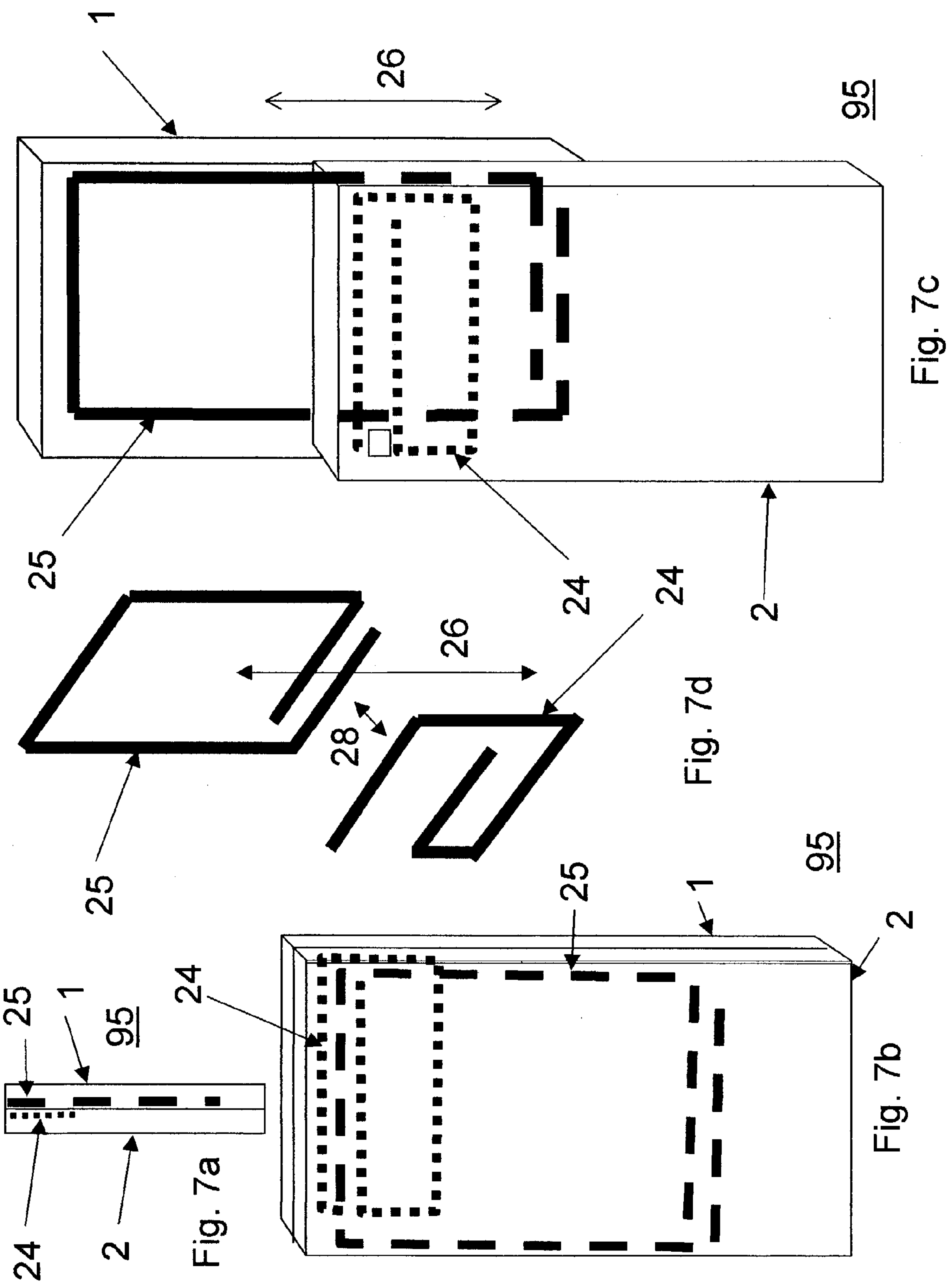
FIG. 7*a*illustrates a side view of a phone.
FIG. 7*b* illustrates a perspective view of a phone in a closed configuration.
FIG. 7*c* illustrates a perspective view of a phone in a partially open configuration.
FIG. 7*d* Illustrates a perspective view of the orientations of two circuits of a phone.

FIGS. 7*a* and 7*b* illustrate side and front perspective views of a phone in a fully closed position. In one embodiment, a phone (95) incorporates one or more aspect of embodiments described previously herein. In one embodiment, phone (95) comprises a first panel (1) coupled to a second panel (2). In one embodiment, panel (1) includes one or more circuit element coupled to panel (1). In one embodiment an antenna (25) comprises the one or more circuit element coupled to panel (1). In one embodiment, panel (2) includes one or more circuit element coupled to the panel. In one embodiment, an antenna (24) comprises the one or more circuit element coupled to the panel (2). In one embodiment, antennas (24) and (25) comprise a capacitively coupled dipole antenna, for example, as previously described above.

FIGS. 7*c* and 7*d* illustrate respective a front perspective view of a phone in an open configuration and a perspective view of the orientation of two antennas. In one embodiment, phone (95) comprises a sliding panel phone configuration known to those skilled in the art. It is understood that in a sliding panel phone configuration, one panel may be coupled to a second panel by a hinge in a manner that effectuates sliding of the one panel relative to the second panel, for example, in a linear direction (26). It is understood that if the first panel or the second panel is held by the hand of the user, the other panel is typically used by the user to listen to a device for converting an electrical signal into sound. It is identified that a signal received by either antenna (24) or (25) of a fully closed, partially open, or a fully open phone (95) may be coupled between antennas (24) and (25) across a gap, for example, across a gap (28) as illustrated in FIG. 7*d*. It is identified that depending on the orientation of the panels of phone (95), the capacitance across the gap (28) may be different. It is also identified that, when in a partially open or fully open configuration, if a user's hand holds one panel, the capacitative and loading effects by the user's hand on the antenna in the second panel may be minimized.

Thus, the invention is not to be limited by the foregoing illustrative details, but rather is to be defined by the appended claims.

The invention claimed is:

1. A hand held phone used to transfer a signal, comprising:
- a first panel;
- a second panel physically coupled to the first panel via a hinge;
- an antenna, wherein the antenna is coupled to the first panel;
- a circuit, wherein the circuit is coupled to the second panel; and
- a coupling portion, wherein the coupling portion couples the signal between the antenna and the circuit across a physical gap;
- wherein the capacitance across the gap remains relatively constant regardless of the position of the first panel and second panel relative to each other.

2. The phone of claim 1, wherein the antenna comprises a capacitatively loaded dipole antenna.

3. The phone of claim 1, wherein the first panel comprises a ground plane.

4. The phone of claim 1, wherein the phone comprises a flip-phone.

5. The phone of claim 4, wherein the second panel comprises a panel intended to be held by the hand.

6. The phone of claim 4, wherein the first panel and the second panel are connected by a conductive hinge.

7. The phone of claim 4, wherein the first panel and the second panel are connected by a non-conductive hinge.

8. The phone claim 1, wherein the second panel comprises a device for converting sound into an electrical signal, and
- wherein the first panel comprises a device for converting an electrical signal into sound.

9. The phone of claim 1, wherein the first panel comprises a device for converting sound into an electrical signal, and
- wherein the second panel comprises a device for converting an electrical signal into sound.

10. The phone of claim 1, wherein the coupling portion comprises one or more portion, wherein the one or more portion is separated by one or more gap that varies in dimension.

11. A coupler for coupling a signal between an antenna and a circuit, comprising
- a first portion, wherein the first portion is electrically coupled to the antenna, the antenna being completely disposed on the first portion; and
- a second portion, wherein the second portion is electrically coupled to the circuit, and wherein the second and first portion are separated by a physical gap,
- wherein the first portion and the second portion are coupled over a range of orientations, and wherein the gap defines a dimension that changes over the range of orientations.

12. A phone, comprising:
- an antenna disposed completely on a first portion,
- a circuit disposed completely on a second portion; and
- a coupling portion, wherein the coupling portion couples a signal between the antenna and the circuit across a physical gap between the first portion and the second portion,
- wherein the gap defines an approximately constant dimension.

13. A method for transferring a signal in a phone, comprising the steps of:
- disposing a first portion and a second portion in the phone to define a gap; and capacitatively coupling the signal across the gap;
- disposing an antenna completely on the first portion;
- coupling the first portion to a first panel; and
- coupling the second portion to a second panel; and
- moving one or more of the panels to change a dimension defined by the gap.

14. The method of claim 13, further comprising the steps of:
- coupling the first portion to an antenna; and
- coupling the second portion to a circuit.

15. The method of claim 13, wherein the antenna comprises a dipole antenna.

* * * * *